United States Patent [19]

Howard, Jr. et al.

[11] 4,304,685
[45] Dec. 8, 1981

[54] LARGE PORE ALUMINA-SUPPORTED TRANSITION METAL ALKYL

[75] Inventors: Edward G. Howard, Jr., Hockessin; Walter Mahler, Wilmington, both of Del.

[73] Assignee: E. I. Du Pont de Nemours and Company, Wilmington, Del.

[21] Appl. No.: 174,253

[22] Filed: Jul. 31, 1980

[51] Int. Cl.³ .............................. C08F 4/02; C08F 4/76
[52] U.S. Cl. ..................................... 252/430; 526/154; 526/170; 252/431 R
[58] Field of Search ........................... 252/430, 431 R

[56] References Cited

U.S. PATENT DOCUMENTS

| | | | |
|---|---|---|---|
| 3,635,935 | 1/1972 | Long | 252/431 R X |
| 3,840,508 | 10/1974 | Ballard et al. | 252/431 R X |
| 3,932,307 | 1/1976 | Setterquist | 252/430 |
| 3,950,269 | 4/1976 | Setterquist | 252/430 |
| 3,971,767 | 7/1976 | Setterquist | 526/65 |
| 4,011,383 | 3/1977 | Setterquist | 526/154 |
| 4,017,525 | 4/1977 | Setterquist | 252/431 R X |
| 4,018,707 | 4/1977 | Wyatt | 252/430 |
| 4,056,669 | 11/1977 | Ballard et al. | 252/430 X |
| 4,228,263 | 10/1980 | Howard et al. | 252/431 R X |

FOREIGN PATENT DOCUMENTS 2001080  1/1979  United Kingdom.

*Primary Examiner*—Patrick Garvin

[57] ABSTRACT

In a process for polymerizing a 1-olefin with a catalyst system comprising a reaction product of a porous alumina and an organometallic compound of the formula $(RCH_2)_4M$ wherein M is Ti, Zr, or Hf and R is a group which is such that there is no hydrogen atom attached to an atom which is in the $\beta$-position to M, and more specifically, R is aryl, aralkyl, tertiary alkyl, for example, trialkylmethyl, or trialkylsilyl, the improvement characterized in that the alumina has an average pore diameter of at least about 150 Å and/or at least about 10% of the total pore volume of the alumina is provided by pores having diameters greater than about 200 Å.

5 Claims, 2 Drawing Figures

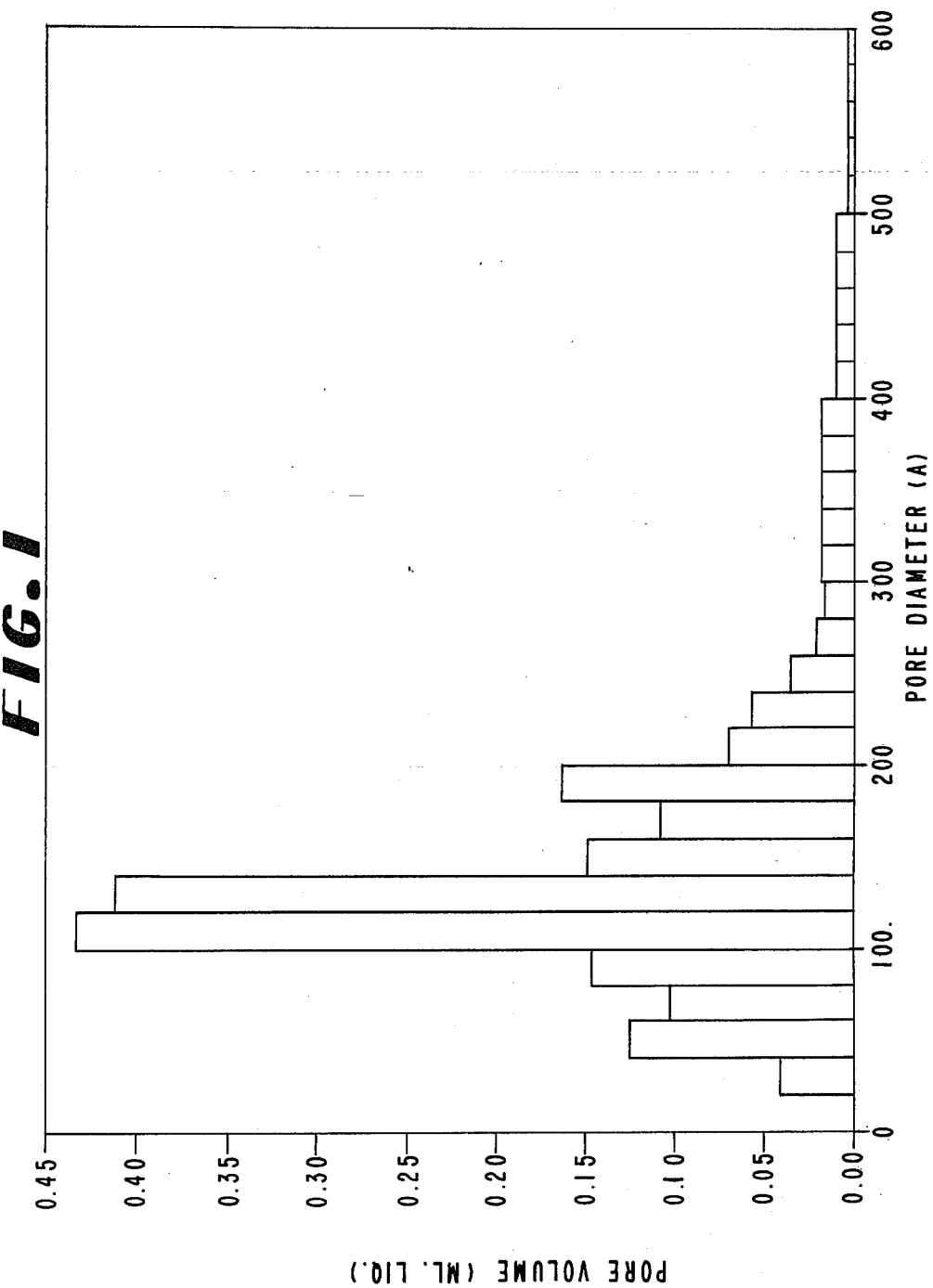

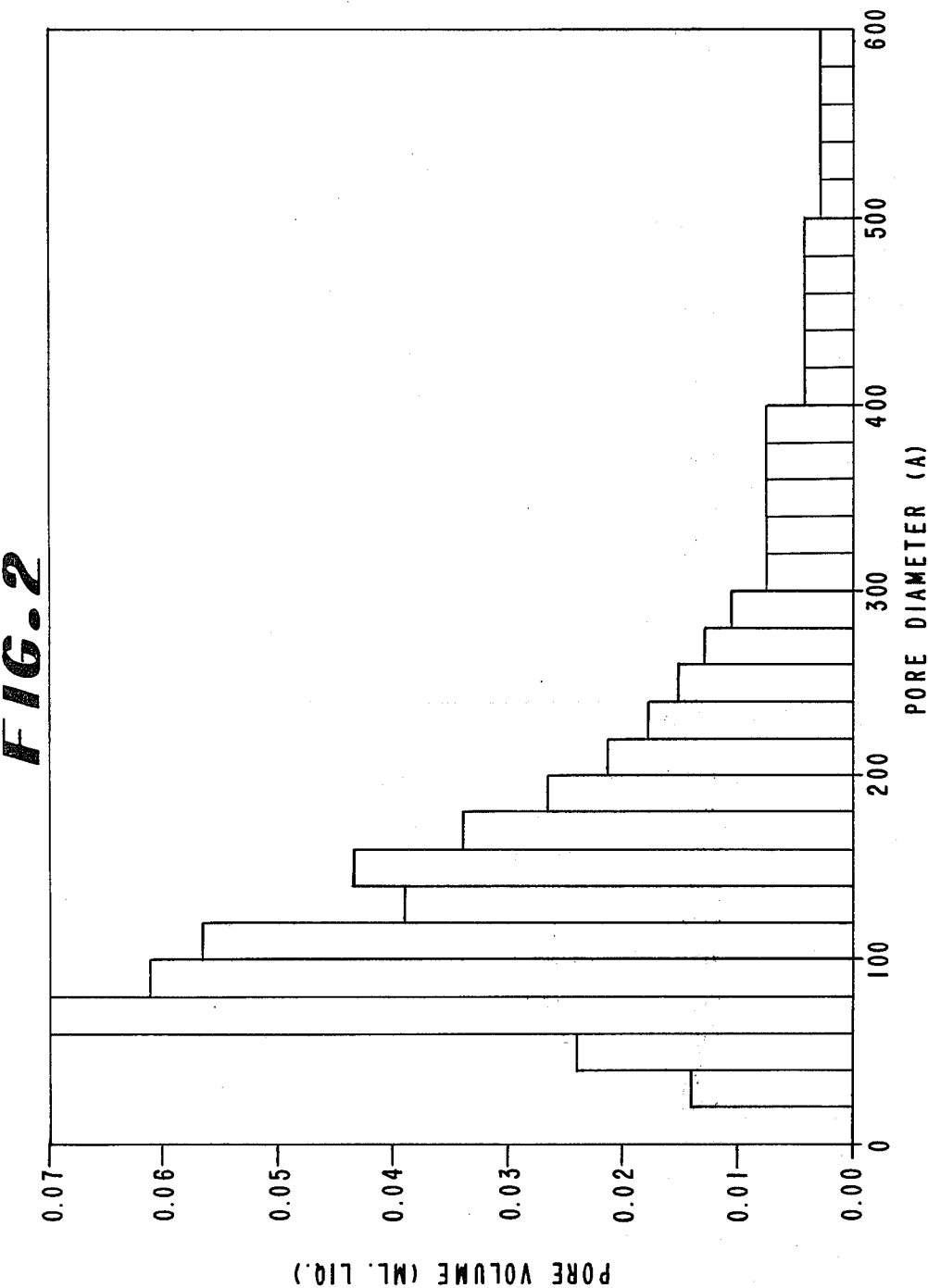

LARGE PORE ALUMINA-SUPPORTED TRANSITION METAL ALKYL

DESCRIPTION

1. Technical Field

This invention relates to a catalyst system for polymerizing 1-olefins. More particularly, it relates to products formed by reacting aluminas whose surfaces have pores of relatively large diameters with selected tetrahydrocarbyl derivatives of Group IVa metals, and to their uses as catalyst systems in such polymerizations.

2. Background

U.S. Pat. No. 3,840,508 discloses a process for polymerizing olefinically unsaturated monomers using as an initiator a reaction product of a transition metal complex and a matrix material which has a hydroxylated surface but which is otherwise substantially inert.

Copending application Ser. No. 917,281 filed June 20, 1978 and now U.S. Pat. No. 4,228,263 discloses a catalytic process for preparing elastomeric polymers of propylene. The catalyst, which is a reaction product of a metal oxide and an organometallic compound of the formula $(RCH_2)_4M$ wherein M is Zr, Ti or Hf and R is aryl, aralkyl, tertiary alkyl or trialkylsilyl, is prepared in situ in a solvent consisting principally of liquid propylene. A similar process for preparing elastomeric polypropylene, using the catalyst system of U.S. Pat. No. 3,932,307, infra, is disclosed in British Specification 2,001,080.

U.S. Pat. No. 3,932,307 discloses a process for polymerizing 1-olefins with the catalyst which consists essentially of the reaction product of tetraneophylzirconium and a hydroxylated oxide of a metal of Group IIa, IIIa, IVa or IVb of the Periodic Table of the Elements. Fumed alumina, i.e., alumina prepared by burning aluminum chloride in the presence of water vapor, is an exemplified preferred metal oxide and provides an especially active catalyst system. Related catalyst systems and polymerization processes are disclosed in U.S. 3,950,269; 3,971,767; and 4,011,383.

Although catalyst systems employing fumed alumina are highly active, the use of such alumina has certain disadvantages in that it is relatively expensive, its preparation is energy consumptive, and it has a relatively low bulk density (about 0.055 g/ml), which makes it inconvenient to handle. A need exists, therefore, for a material which: can be substituted for the fumed alumina; provides a highly active catalyst system; is easy to handle and relatively inexpensive to prepare; and is not unduly energy consumptive in its preparation.

BRIEF DESCRIPTION OF DRAWINGS

FIGS. 1 and 2 include bar graphs which show the pore volume distributions vs. pore diameters for the aluminas of Examples 1 and 2.

DISCLOSURE OF INVENTION

For further comprehension of the invention, and of the objects and advantages thereof, reference may be made to the following description and accompanying drawings, and to the appended claims in which the various novel features of the invention are more particularly set forth.

The invention herein is based on the discovery that active catalysts for polymerizing 1-olefins can be obtained by reacting tetraneophylzirconium or other selected tetrahydrocarbyl derivatives of a Group IVa metal with a porous alumina which has an average pore diameter of at least about 150 A and/or at least about 10% of whose total pore volume is provided by pores having diameters greater than about 200 A. Aluminas of this type are available commercially; alternatively, they can be made by procedures that are described hereinafter. As far as is known, all such aluminas are made by precipitation methods and, consequently, they are less expensive to prepare than fumed aluminas. In addition, they have relatively high bulk densities (for example, about 0.30–0.35 g/ml for commercially available materials) and are easy to handle.

The average pore diameter of an alumina, along with its surface area, can be determined as follows. First, the isotherms for nitrogen adsorption and desorption are measured by conventional techiques. The data from these determinations are fed to a computer, which effects the calculations and prepares the numerical and graphical information described below. The calculation of surface area is based on the wellknown B.E.T. adsorption isotherm (Brunauer, Emmett, and Teller, J. Am. Chem. Soc. 60, 309 (1938)). The pore-volume distribution as a function of pore diameter is calculated, assuming cylindrical pores, by the method of B. F. Roberts, J. Colloid and Interface Sci. 23, 266 (1967), in which the Kelvin equation of capillary condensation is used to relate the capillary diameter to the nitrogen gas pressure. The average pore diameter is calculated from the B.E.T. surface area and the total measured saturation volume from the equation $d = 10^4(4V/S)$ wherein d is the average pore diameter in angstroms, V is the total measured saturation volume in $(cm^3/g)$, and S is the B.E.T. surface area in $(m^2/g)$.

The computer generates bar graphs of pore-volume distribution. Such graphs are illustrated in FIGS. 1 and 2 wherein pore volumes (in ml) are plotted against pore diameters (in A); these graphs give the pore-volume distributions for the aluminas used in Examples 1 and 2, respectively. The area in any one bar of such a graph divided by the total area of all the bars gives the fraction of the total pore volume contributed by pores having diameters in the range corresponding to the particular bar. Similarly, the sum of the areas in two or more adjoining bars, divided by the total area, gives the percentage of total pore volume contributed by pores having diameters over the range corresponding to the bars in question.

To determine whether a particular alumina will give an active catalyst in the present invention, it is usually sufficient merely to determine its average pore diameter. As noted above, any porous alumina having an average pore diameter of at least about 150 A will provide such an active catalyst. However, it is conceivable that an alumina may have a relatively large number of pores of extremely small diameters and a relatively small number of pores of large diameters, so that the average pore diameter would be below 150 A, and yet be usable to form an active catalyst because of its large-diameter pores. A secondary method of predicting whether an alumina forms an active polymerization catalyst on reaction with an organo(transition metal) compound can be used. Any alumina in which at least about 10% of the total pore volume is provided by pores having diameters greater than about 200 A is operable in the present invention. In general, it is preferred that the average pore diameter be as large as possible, although it is to be understood that once a certain average diameter is reached, no further improvement in carrying out the process of the invention will be realized by further increasing the alumina pore diameter.

The organometallic compound used in the invention is of the formula $(RCH_2)_4M$ wherein M is Ti, Zr, or Hf and R is a group which is such that there is no hydrogen atom attached to an atom, usually a carbon atom, which is in the $\beta$-position to M. More specifically, R is aryl, aralkyl, tertiary alkyl, for example, trialkylmethyl, or trialkylsilyl. Examples of $RCH_2-$ include neophyl, benzyl and trimethylsilylmethyl. Representative organometallic compounds include tetraneophyl zirconium, -titanium or -hafnium, tetraneopentyl zirconium, -titanium or -hafnium, and tetrabenzyl zirconium, -titanium or -hafnium.

The 1-olefins that can be homopolymerized and/or copolymerized by means of the catalysts and polymerization processes of this invention include, in particular, ethylene, propylene, butene-1, pentene-1, hexene-1, heptene-1, octene-1, nonene-1, decene-1, 1,3-butadiene, 1,4-hexadiene, and other dienes having at least one terminal olefinic group. Homopolymers and copolymers which can be and/or have been prepared by the process of this invention, some of which preparations are described in the examples hereinafter, include ethylene and propylene homopolymers, ethylene-propylene copolymers and ethylene-propylene-1,4-hexadiene terpolymers.

The process conditions for carrying out homopolymerizations or copolymerizations with the catalysts of the invention are those commonly used in the art for polymerizing 1-olefins with catalysts of the general type employed here. In connection therewith, reference may be made to the background discussion provided hereinabove. For example, the polymerizations can be conducted at $10°-300°$ C. at pressures of 1–1000 atmospheres ($1-1000 \times 10^5$Pa) or more, using slurry or solution polymerization techniques. Inert hydrocarbon media, including alkanes and cycloalkanes, such as n-hexane, n-heptane, or cyclohexane, and aromatic componds, such as toluene, can be employed. Known means can be used to control molecular weight and/or molecular weight distribution.

EXAMPLE 1

A. Preparation of Alumina

A solution of 80 g of ammonium nitrate in 100 cc of water was added to a solution of 375 g of aluminum nitrate nonahydrate in one liter of water. The resulting solution was poured into a solution of 300 cc of concentrated ammonium hydroxide in 300 cc of water in a plastic beaker. A thick white precipitate appeared. The mixture was allowed to stand for 5 minutes and was then cooled in dry ice. After the contents had frozen, the beaker was removed from the dry ice, and the mixture was allowed to thaw and then filtered. The solid on the filter was washed with water until substantially free of base, washed with acetone, air-dried, and then dried at $120°$ C. for 24 hours. The white powdery alumina thus obtained weighed 62 g and had a volume of 333 ml (0.19 g/ml). Its surface area was 463 m$^2$/g; average pore diameter, 173 A; and pore volume, 2.00 ml/g. After being heated at $400°$ C. for 4 hours, its surface area was 497 m$^2$/g; average pore diameter, 180 A; and pore volume, 2.24 ml/g. FIG. 1 depicts the pore-volume distribution for this alumina.

B. Polymerization of Propylene

A dry, oxygen-free, 1-liter, stainless-steel autoclave equipped with a stirrer was charged with a suspension of 60 ml of cyclohexane and 2 g of the alumina of Part A, to which had been added 0.2 mmol of tetraneophylzirconium as a 0.1 M solution in toluene. The autoclave was cooled in dry ice/acetone and charged with 168 g of propylene. On stirring and warming, an exothermic polymerization occurred, causing the temperature to rise at $70°$ C. The mixture was stirred at $70°-50°$ C. and autogeneous pressure for 1 hour from the time when the temperature first reached $50°$ C., after which volatile materials were removed by evaporation and the polymer was air-dried. The elastomeric polypropylene thus produced weighed 151 g (90% yield) and had properties typical of those of known elastomeric polypropylenes.

C. Polymerization of Propylene

In a confirmatory experiment, the procedure of Part B was substantially repeated. An exothermic polymerization again took place, the temperature rising from $50°$ C. to $66°$ C. in four minutes. The yield of elastomeric polypropylene was 140 g (83% yield).

COMPARATIVE EXPERIMENT 1

A. Example 1B was substantially repeated, except that the catalyst was made from an alumina having an average pore diameter of 67 A, i.e., a catalyst outside this invention. Only 10 g (6% yield) of polypropylene was produced.

B. The procedure of Part A was substantially repeated, except that 20 g of ethylene was charged in addition to the other materials. Also, in this experiment 0.15 mmol of tetraneophylzirconium was used instead of 0.20 mmol as in Part A; this difference would not be expected to affect the yield substantially. In spite of the fact that ethylene is easier to polymerize than propylene with catalysts of this type made from active aluminas, the yield of solid polymer, presumably an ethylene/propylene copolymer, was only 12 g (6% yield).

EXAMPLE 2

A. Polymerization of Propylene

The alumina used in this example was Alcoa ® XF-100 (about 0.30–0.35 g/ml bulk density) that had been heated at $400°$ C. for 4 hours in a stream of nitrogen. Following this treatment its average pore diameter was 208 A; surface area, 121 m$^2$/g; and pore volume, 0.63 ml/g. Its pore-volume distribution is depicted in FIG. 2. The process of Example 1B was substantially repeated except that the amount of tetraneophylzirconium was 0.25 mmol and the amount of cyclohexane was 100 ml. Drying the solid product at $120°$ C. for 1 hour gave 46.5 g (28% yield) of elastomeric polypropylene. Its properties were typical of known elastomeric polypropylenes.

B. Polymerization of Propylene; Effect of Washing Alumina with Acid

The alumina used in Part A apparently had base associated with it. This was shown by adding water to indicator paper that was in contact with the alumina. A 25-g sample of the alumina was suspended in 200 ml of distilled water, and 44 ml of 0.2 M sulfuric acid was added. The mixture was stirrer for 30 minutes, and the solid was separated by filtration, washed with water, and dried. A small sample was dried further at $400°$ C. in a stream of nitrogen for 4 hours for use in the following polymerization.

The procedure of Part A was substantially repeated, except that 0.2 mmol of tetraneophylzirconium was used and the temperature was 48°–55° C. The amount of elastomeric polypropylene recovered was 69 g (41% yield).

EXAMPLE 3

Copolymerization of Ethylene and Propylene

The autoclave of Example 1B was charged with 300 ml of cyclohexane, 168 g of propylene, and 20 g of ethylene. The mixture was heated at 125° C., at which temperatures a slurry of 1 g of the alumina of Example 1A, 60 ml of cyclohexane, and 0.2 mmol of tetraneophylzirconium was charged. The resulting pressure (800 psi, 5516 KPa) was maintained at 125° C. with ethylene until about 20 g of ethylene (measured by weight difference) in addition to the original ethylene charged had been consumed. This required 19 minutes. Pressure was then released, and the reactor was cooled. The solid product was separated and dried at 120° C./0.5 mm for 3 hours, to give 60 g (29% yield, a good yield at the 125° C. polymerization temperature) of a very soft elastomeric ethylene/propylene copolymer.

EXAMPLE 4

High-Temperature Polymerization of Ethylene

A dry, oxygen-free, stainless-steel autoclave was charged with a suspension of 1.5 g of the acid-treated dried alumina of Example 2B in 500 ml of cyclohexane. The autoclave was closed and heated at 260° C., at which temperature ethylene was injected until the internal pressure had been increased by 300 psi (2068.5 KPa). Then a solution of 0.15 mmol of tetraneophylzirconium in 50 ml of cyclohexane was pressured in with stirring. After 5 minutes at 260° C. the initial pressure (840 psi, 5791.8 KPa) had dropped to 740 psi (5102.3 KPa). At this point the excess pressure was released and the reactor was cooled. There was obtained 12 g of polyethylene, which was shown by gel-permeation chromatography to have a $\overline{M}_w$ of 8300, a $\overline{M}_n$ of 1200, and a polydispersity index of 6.87, all the evaluations being carried out using conventional procedures. The curve of molecular-weight distribution had two peaks of the same intensity.

EXAMPLE 5

An autoclave like that of Example 1B was charged with 2 g of Alcoa ® XF-100 alumina (Example 2A) and 100 ml of cyclohexane. It was closed, charged with 168 g of propylene, and heated to 50° C. with stirring. At this temperature 50 ml of cycohexane containing 0.2 mmol of tetrabenzylzirconium as a 0.1 M solution in toluene was injected. An exothermic reaction occurred and the temperature rose to 70° C., returning to 50° C. in 8 minutes. The polymerization was continued at 50° C. for 1 hour after injection of the tetrabenzylzirconium, and the product was isolated as in Example 1B to give 47 g (28% yield) of elastomeric polypropylene.

EXAMPLE 6

The alumina in this example was Alcoa ® type B boehmite (alumina monohydrate) that had been calcined at 550° C. in a stream of nitrogen for 18 hours. A sample of the same material that had been calcined at 400° C. under nitrogen for 4 hours had an average pore diameter of 202.3 A. Using substantially the same procedures described in Example 1B, 70 ml of cyclohexane, 1.5 g of boehmite, 0.2 mmol of tetraneophylzirconium, and 168 g of propylene were processed at 50° C. and autogeneous pressure for 1 hour. The elastomeric polypropylene thus produced weighed 43 g (26% yield).

BEST MODE FOR CARRYING OUT THE INVENTION

The process of the invention is best carried out with a catalyst prepared from alumina having a large average pore diameter, as more fully described hereinabove.

INDUSTRIAL APPLICABILITY

The industrial applicability of 1-olefin polymers, as well as catalysts and processes for preparing such polymers, is well known to one skilled in this art.

Although preferred embodiments of the invention have been illustrated and described in the above disclosure, it is to be understood that there is no intent to limit the invention to the precise constructions herein disclosed, and it is to be further understood that the right is reserved to all changes and modifications coming within the scope of the invention as defined in the appended claims.

We claim:

1. In a 1-olefin polymerization catalyst system comprising a reaction product of a porous alumina and an organometallic compound of the formula $(RCH_2)_4M$ wherein M is Ti, Zr or Hf and R is a group which is such that there is no hydrogen atom attached to an atom which is in the $\beta$-position to M, the improvement characterized in that the alumina has an average pore diameter of at least about 150 A and/or at least about 10% of the total pore volume of the alumina is provided by pores having diameters greater than about 200 A.

2. Catalyst system of claim 1 wherein the alumina has a bulk density of about 0.30–0.35 g/ml.

3. Catalyst system of claim 1 wherein R is aryl, aralkyl, tertiary alkyl or trialkylsilyl.

4. Catalyst system of claim 1 wherein the atom which is in the $\beta$-position to M is carbon.

5. Catalyst system of claim 1 wherein the orgaometallic compound is tetraneophylzirconium.

* * * * *